United States Patent [19]
Olson

[11] Patent Number: 5,943,392
[45] Date of Patent: Aug. 24, 1999

[54] DEVICE FOR MEASURING ECHO RETURN LOSS IN A TWO-TWO WIRE LINE SYSTEM

[75] Inventor: Gregory David Olson, Dallas, Tex.

[73] Assignee: Southwestern Bell Telephone Company, San Antonio, Tex.

[21] Appl. No.: 08/788,294

[22] Filed: Jan. 24, 1997

[51] Int. Cl.⁶ .................................................. H04M 1/24
[52] U.S. Cl. ............................... 379/3; 379/24; 379/406; 379/407; 379/410; 379/415
[58] Field of Search .................. 379/1, 3, 6, 24, 379/406, 407, 410, 415–417, 400, 402, 403

[56] References Cited

U.S. PATENT DOCUMENTS

| | | |
|---|---|---|
| 1,459,770 | 6/1923 | Jones . |
| 1,653,738 | 12/1927 | Silent . |
| 1,740,621 | 12/1929 | Nyquist . |
| 2,472,894 | 6/1949 | Gillings et al. ......................... 379/406 |
| 3,660,620 | 5/1972 | Schimpf ...................................... 379/6 |
| 4,024,359 | 5/1977 | De Marco et al. ......................... 379/6 |
| 4,727,566 | 2/1988 | Dahlqvist . |
| 4,947,425 | 8/1990 | Grizmala et al. . |
| 5,193,112 | 3/1993 | Sano . |
| 5,390,250 | 2/1995 | Janse et al. . |
| 5,418,848 | 5/1995 | Armbruster . |
| 5,577,097 | 11/1996 | Meek ........................................... 379/3 |

OTHER PUBLICATIONS

Rugo, Checking Echo Suppressors, Bell Laboratories Record, Mar. 1970.
Oliver, Echo and Singing in Long–Distance Circuits, Telephony, Mar. 1971.
Wittke et al.,Measurement of Echo Parameters Pertinent to High–Speed Full–Duplex Data Transmission on Telephone Circuits, IEEE Journal on Selected areas in Communications, vol. SAC–2, No. 5, Sep. 1984.

*Primary Examiner*—Curtis A. Kuntz
*Assistant Examiner*—Duc Nguyen
*Attorney, Agent, or Firm*—Greenblum & Bernstein, P.L.C.

[57] ABSTRACT

The present invention is directed to an adaptor for measuring an echo return loss in a communication system. The adaptor includes two transformers, each having a primary winding and two secondary windings. The secondary windings are cross-connected to form first and second out of phase circuits. The first circuit includes impedance elements which match an impedance of an external device. When the external device is attached to the second circuit, the first and second circuits are schematically equivalent, albeit out of phase. When an oscillation signal is input to one transformer, the matched impedance and out-of-phase connection of the secondary windings cancel the signal such that only an echo signal is output by the other transformer.

19 Claims, 4 Drawing Sheets

DEVICE FOR MEASURING ECHO RETURN LOSS IN A TWO-TWO WIRE LINE SYSTEM

BACKGROUND OF THE INVENTION

1. Field of the Invention

The present invention relates to a device for measuring Echo Return Loss in a communication system. More specifically, the present invention is directed towards a device which accurately measures the Echo Return Loss produced by a two-two wire connection in a communication system.

2. Description of the Prior Art

Two-two wire connector circuits are commonly used in two-way communication systems, such as a telephone system. Two-wire telephone systems rely on a pair of wires to transmit and receive signals. However, as the distance between points in the communication system increase, the signal strength drops due to propagation losses.

In order to overcome the above difficulty, an amplifier can be placed within the signal path to boost the signal. However, since an amplifier can only boost a signal in one direction of a two-way communication system, two amplifiers are required (i.e., one amplifier to boost transmitted signals and another to boost received signals). Thus, the original two wires are split into four wires; two wires for transmitting signals and two wires for receiving signals. Following amplification, the four wires are recombined into two wires.

A simplified block diagram representing a two-two wire connector is shown in FIG. 1. On the left side of FIG. 1, two wire lines 10 and 20 connect to Point A; the signals are typically in the established voice frequency range. A transmission signal on wires 10 and 20 from Point A is split by network N1 into two transmission lines 12 and 14 to form a transmission path with respect to Point A. Along the path, the signal is boosted by at least one amplifier 16. After being amplified, the propagated signal is recombined by network N2 into wires 18 and 22, and continues on to Point B (e.g., a central office, another node, a user, etc.).

Similarly, transmission signals from Point B on wires 18 and 22 are split by network N2 into two transmission lines 24 and 26; lines 24 and 26 form a path with respect to Point A. Along the path, the signal is boosted by at least one amplifier 28. After being boosted, the signal is recombined by network N1 and sent along to Point A as a received signal.

The networks N1 and N2 rely primarily upon a series of transformers to split the signals. However, the transformers are not typically in perfect balance. They thus partially reflect a transmission signal back toward its origination point, otherwise known as an "echo". For example in FIG. 1, a portion of a signal sent from Point A to Point B is reflected by network N2 and returns to Point A. A user will thus hear the echo of his own voice.

The production of echoes due to imperfect balance in networks N1 and N2 can be minimized by adjusting the parameters which balance the network, e.g., a technician can fine tune network N2 by manipulating parameters A–C until the echo reduces to a desirable level. To this end, it is necessary to monitor the echo return loss of the two-two wire converter during manipulation of the network to identify those parameters which minimize the presence of echoes.

Although Echo Return Loss measurement devices are commercially available, their use of sophisticated circuitry makes them expensive, difficult to transport due to their bulk, and require manual interaction during measurement. In addition, these devices experience wide bandwidth noise which reduces the accuracy of the echo measurement.

SUMMARY OF THE INVENTION

It is accordingly an object of the present invention to overcome the drawbacks of the prior art.

It is accordingly a further object of the invention to provide an echo return loss measurement device which is smaller, less expensive, more accurate, and simpler to use than the prior art.

To this end, the present invention is directed toward an adaptor ("the ERL adaptor") which can be inserted into a communication system to isolate and measure the echo return loss of the two-two wire connector.

The present invention includes first and second transformers, each having a primary winding and two secondary windings. The primary winding of the first transformer is connected to the two wire input from Point A. The primary winding of the second transformer is connected to a level meter which measures the echo return loss. One secondary winding from each transformer is connected through a resistor and a first capacitor; the remaining secondary windings are connected with a terminal for connection to an external device. These secondary winding configurations are 180 degrees out of phase such that they produce offsetting effects in the primary windings.

The resistor and first capacitor are selected to impedance match the external device; when the external device is connected to the ERL adaptor, the secondary windings are configures such that the transmit and receive signals are out of phase with identical amplitude; as will be noted below, the receive signal will also have an echo component.

When an oscillating signal is applied to the first transformer, the signal is split between the secondary windings. The first of these passes to the second transformer, while the second is sent first to the external device, and then to the second transformer with an echo signal. Upon reaching the second transformer, the offsetting effect of the secondary windings produced by the impedance match causes the original signal to cancel out, leaving only the "echo" signal. This signal is measured by an external level meter to measure the echo return loss of the system.

According to an embodiment of the present invention, there is provided an adaptor for measuring echo return loss. The adaptor is connectable with an external device having an impedance. The adaptor includes a first transformer having a first primary winding connected to an input terminal, and first and second secondary windings, as well as a second transformer having a second primary winding connected to an output terminal, and third and fourth secondary windings. A first circuit includes the second secondary winding, the third secondary winding, and a plurality of circuit elements, where the circuit elements have an impedance substantially equal to the impedance of the external device. A second circuit includes the first and fourth secondary windings and a communication terminal.

According to an aspect of the above embodiment, an impedance of the first circuit substantially matches an impedance of the second circuit when connected to the external device.

According to another aspect of the above embodiment when a signal is applied to the input terminal and the device is connected to the communications terminal, the echo return loss of the device is given by the equation:

$$ERL = ECHO - k$$

where ERL is the echo return loss, ECHO is a signal level output of the output terminal, k is a signal strength loss of the adaptor.

According to a feature of the above aspect of the above embodiment, k is approximately 9.0 dB.

According to yet another aspect of the above embodiment, the plurality of circuit elements includes at least a resistor and a first capacitor.

According to yet another aspect of the above embodiment, the plurality of circuit elements includes a resistor and first and second capacitors, and the second circuit includes a third capacitor.

According to a feature of the above aspect of the above embodiment, the second capacitor has a capacitance equal to that of the third capacitor.

According to yet another aspect of the above embodiment, the external device an MFT or MFT extender.

According to yet another aspect of the above embodiment, the first and second circuits are 180 degrees out of phase.

According to another embodiment of the invention, there is provided an adaptor for measuring an echo return loss. The adaptor includes first and second transformers, each having a primary winding and first and second secondary windings. The primary winding of the first transformer is connected to a first terminal to receive a signal, and the primary winding of the second transformer is connected to a second terminal to output a signal. A first circuit includes the first secondary winding of the first transformer, the second secondary winding of the second transformer, and a third terminal for connection to an external device. A second circuit includes the first secondary winding of the second transformer, the second secondary winding of the first transformer, at least one resistor and at least one capacitor. The first and second circuits have a substantially equal impedance when the external device is connected to the third terminal.

According to an aspect of the above embodiment, an impedance of the at least one resistor and the at least one capacitor is substantially equal to an impedance of the external device.

According to another aspect of the above embodiment, when the device is connected to the third terminal and a signal is applied to the first terminal, the echo return loss of the device is given by the equation:

$$ERL = ECHO - k$$

where ERL is the echo return loss, ECHO is the signal level of the output signal, k is a signal loss of the system.

According to a feature of the above aspect of the above embodiment, k is approximately 9.0 dB.

According to yet another aspect of the above embodiment, the first circuit and the second circuit are 180 degrees out of phase.

According to yet another aspect of the invention, there is provided an adaptor for measuring echo return loss. The adaptor is connectable with an external MFT device and includes a first transformer having a first primary winding connected to an input terminal, and first and second secondary windings, as well as a second transformer having a second primary winding connected to an output terminal, and third and fourth secondary windings. A first circuit includes the second secondary winding, the third secondary winding, a resistor and first and second capacitors; the resistor and the first capacitor have an impedance substantially equal to a COMPNET impedance of the external MFT. A second circuit includes the first and fourth secondary windings, a third capacitor and a communication terminal. The second and third capacitors have equal capacitances.

According to an aspect of the above embodiment, an impedance of the first circuit substantially matches an impedance of the second circuit when connected to the external device.

According to a feature of the above aspect of the above embodiment, when a signal is applied to the input terminal and the device is connected to the communications terminal, the echo return loss of the device is given by the equation:

$$ERL = ECHO - k$$

where ERL is the echo return loss, ECHO is a signal level output of the output terminal, and k is a signal loss of the adaptor. The value of k is approximately 9.0 dB.

According to yet another feature of the above aspect of the above embodiment, the resistance of the first resistor is 910 Ohms, and the capacitance of the first, second, and third capacitors are 2.0 mF.

The present invention is directed to an adaptor for measuring an echo return loss in a communication system. The adaptor includes two transformers, each having a primary winding and two secondary windings. The secondary windings are cross-connected to form first and second out of phase circuits. The first circuit includes impedance elements which match an impedance of an external device. When the external device is attached to the second circuit, the first and second circuits are schematically equivalent, albeit out of phase. When an oscillation signal is input to one transformer, the matched impedance and out-of-phase connection of the secondary windings cancel the signal such that only an echo signal is output by the other transformer.

DETAILED DESCRIPTION OF THE PREFERRED EMBODIMENTS

Figure 1:
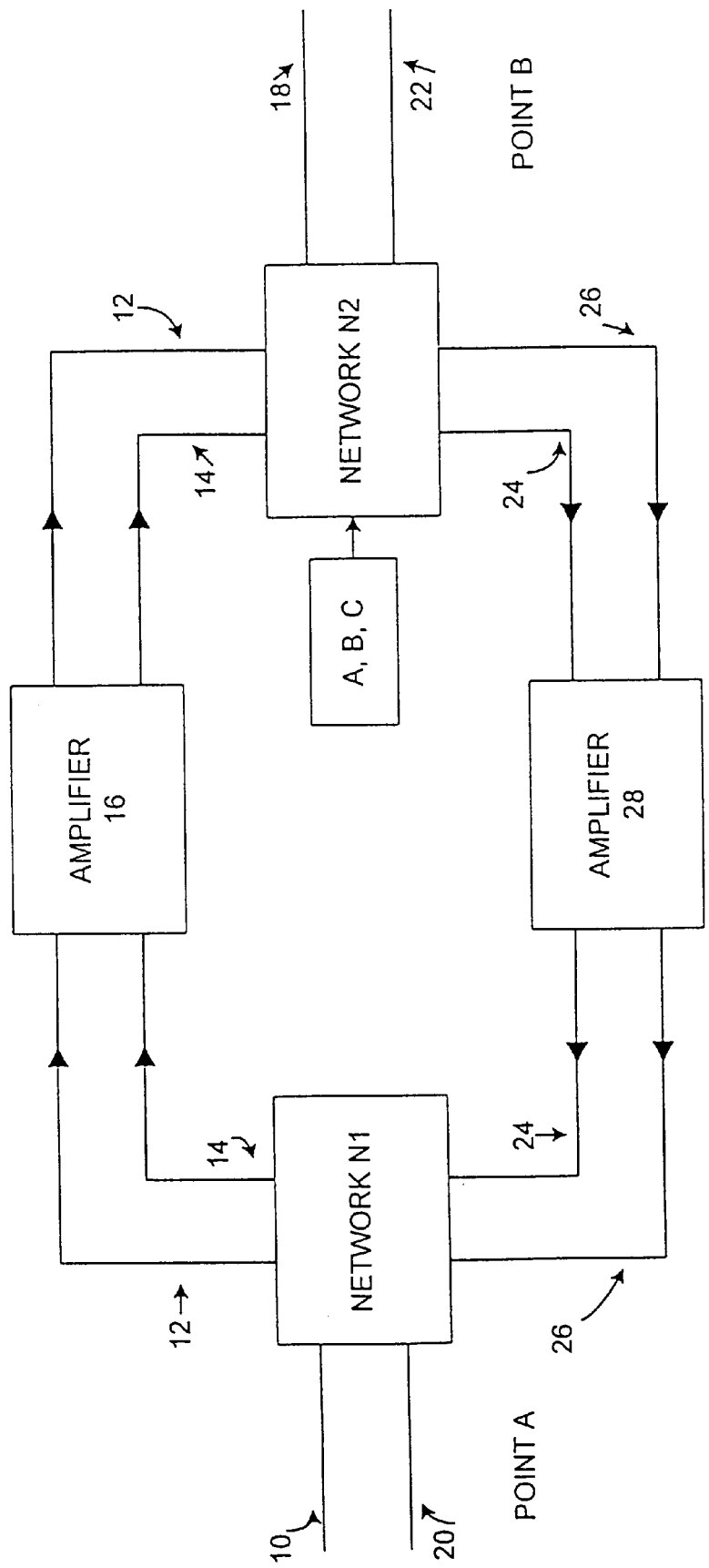
FIG. 1 is a schematic drawing of a two-two line converter.
Figure 2:
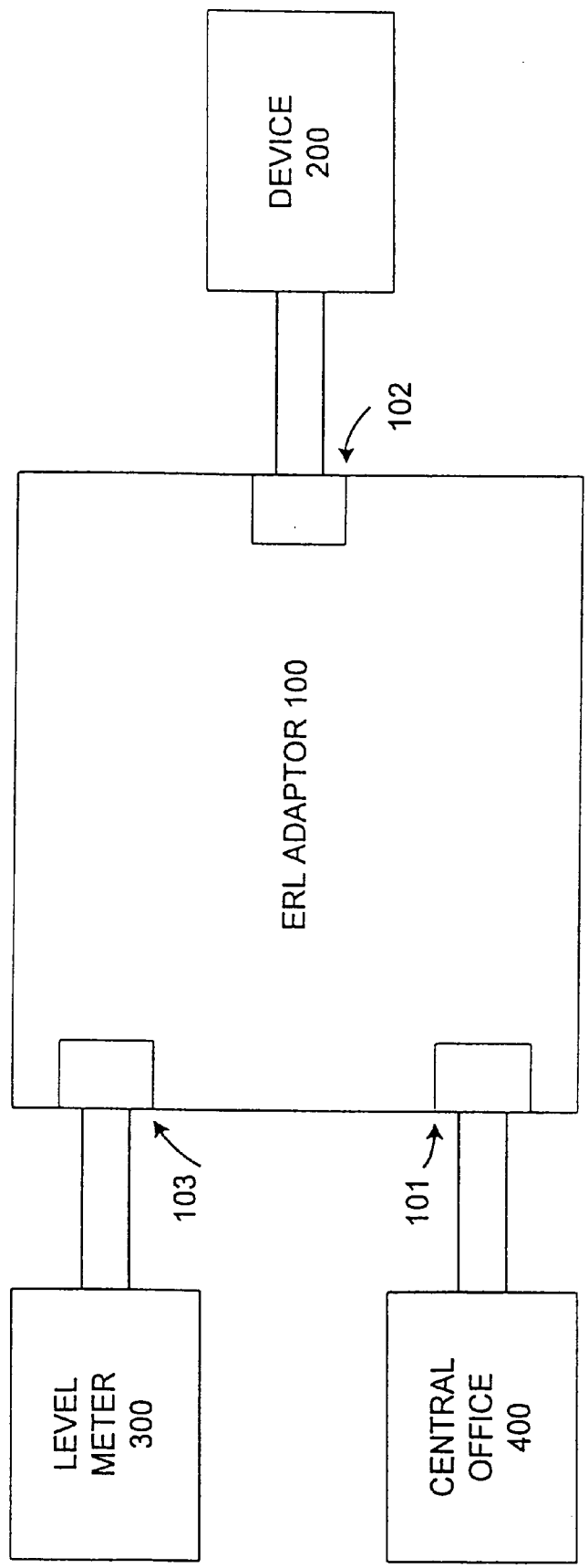
FIG. 2 is a block diagram of the ERL adaptor under operating conditions.

The ERL adaptor 100 is shown in its operating environment in FIG. 2. A technician connects an input terminal 101 to a central office 400, an output terminal 102 to an external device 200 (typically a multi-frequency trunk (MFT) or MFT extender), and a third communication terminal 103 to a level meter 300. As discussed more fully below, ERL adaptor 100 receives an oscillating signal from central office 400. This signal is output from ERL Adaptor 100 at terminal 102 to external device 200. The return signal from the MFT, which includes the reflected "echo", reenters ERL Adaptor 100 through terminal 102. ERL adaptor 100 cancels out the oscillating signal such that only the echo emits from terminal 103 to meter 300, which displays the level of the echo signal.

Figure 3:
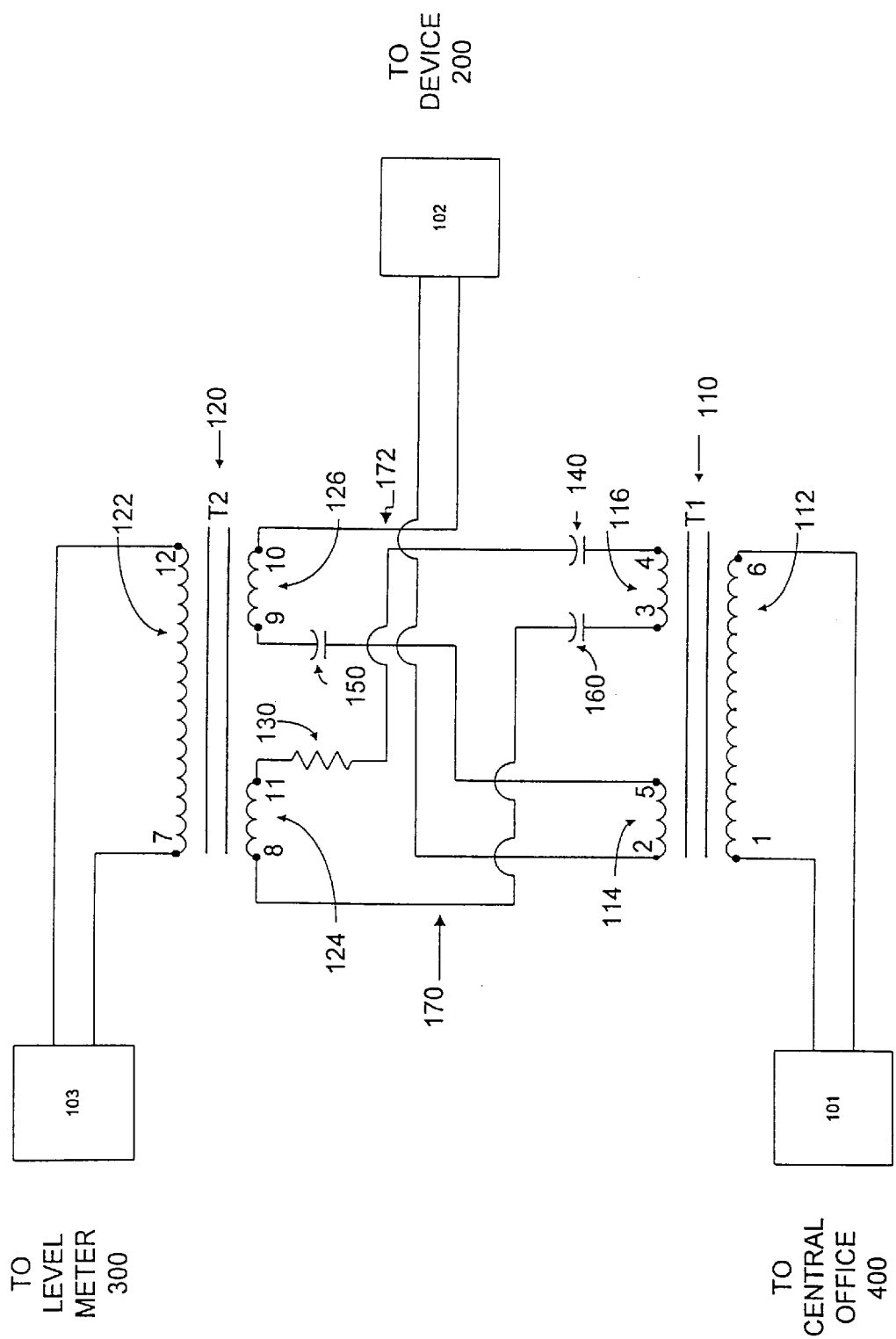
FIG. 3 is a schematic diagram of the ERL adaptor.

The schematic diagram of ERL Adaptor 100 is shown in FIG. 3. A first transformer 110 connects to input terminal 101 at nodes 1 and 6 of its primary winding 112. Similarly, a second transformer 120 connects to output terminal 103 at nodes 7 and 12 of its primary winding 122. Transformer 110 has a pair of secondary windings 114 and 116, while transformer 120 has a corresponding pair of secondary windings 124 and 126.

The various secondary windings of transformers 110 and 120 link together as follows. Secondary winding 124 of second transformer 120 connects with secondary winding 116 of first transformer 110 through resistor 130 and first capacitor 140. Specifically, node 8 of secondary winding 124 connects with node 3 of secondary winding 116 (through third capacitor 160, described below), while node 11 of secondary winding 124 connects with node 4 of secondary winding 116 through resistor 130 and first capacitor 140. The above described connection forms a first bridge circuit 170.

Similarly, secondary winding 126 of second transformer 120 connects with secondary winding 114 of first transformer 110 through terminal 102. Specifically, node 9 of secondary winding 126 connects with node 5 of secondary winding 114 (through second capacitor 150, described below), while node 10 of secondary winding 126 and node 2 of secondary winding 114 both connect to communication terminal 102. This forms a second bridge circuit 172.

Based on the above-described connections, the orientation of the secondary windings 116 and 124 in the first bridging circuit is opposite that of secondary windings 114 and 126 in the second bridging circuit, i.e., the first and second bridging circuits carry signal which are out of phase with each other such that they offset in second transformer 120. In other words, the nodes of secondary windings 124 are connected in an opposite orientation to those of secondary winding 126; this "criss-cross" of nodes with respect to the remaining circuit elements will induce offsetting effects in primary winding 122, as discussed below.

Figure 4:
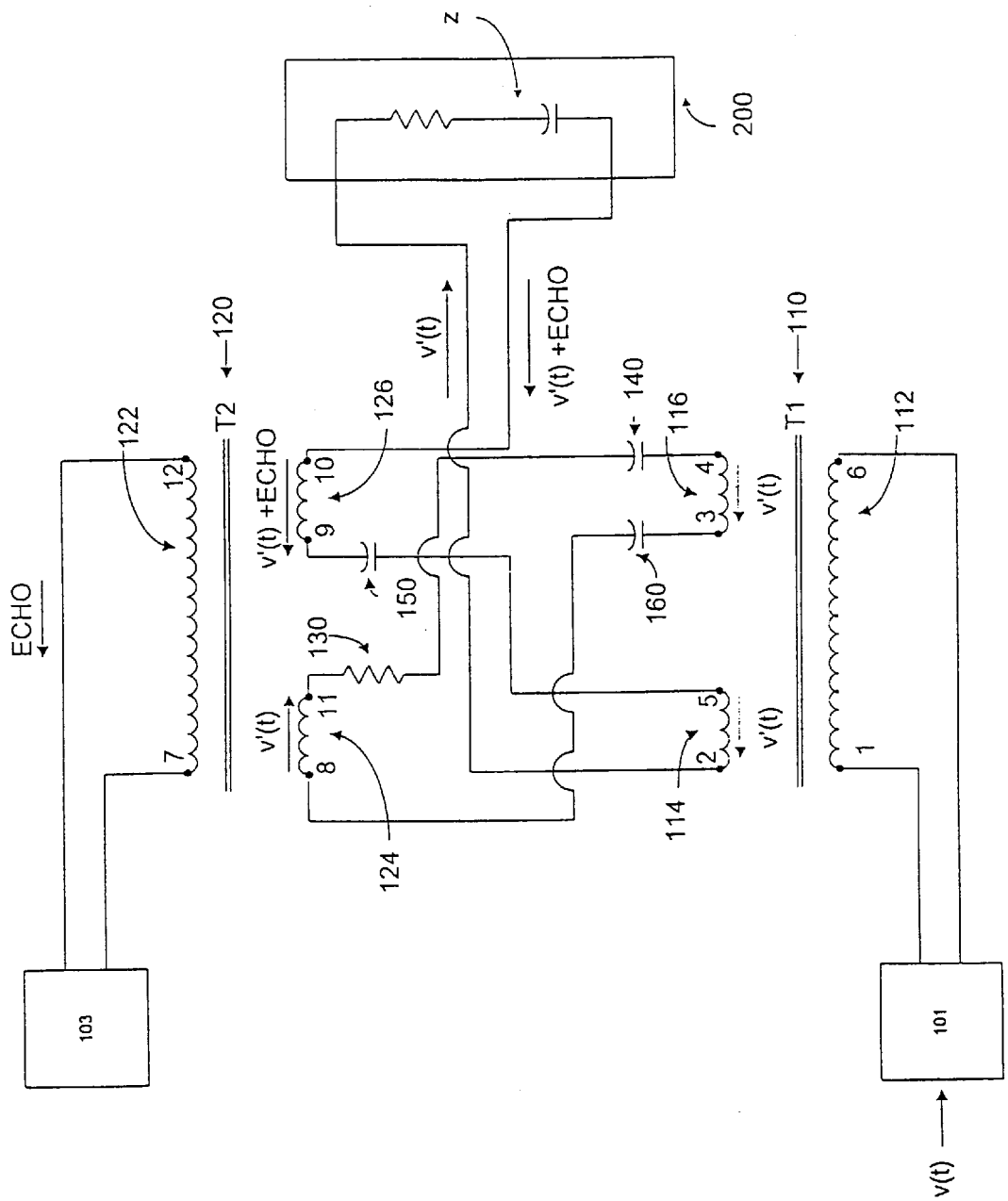
FIG. 4 is a schematic diagram of the ERL adaptor with the impedance produced by an external device.

Referring not to FIG. 4, the portion of device 200 which connects to terminal 102 has an impedance Z (which is essentially constant over the frequency range of the transmitted and received signals); the connection of device 200 to terminal 102 thus places an impedance in the second bridging circuit. Impedance Z is shown schematically in FIG. 4 via the presence of a resistance and capacitance in device 200. Resistor 130 and first capacitor 140 are selected to match impedance Z of device 200 such that the impedance of the first and second bridging circuits are equal; when the impedance is so matched, the first and second bridging circuits have identical characteristics.

ERL Adapter 100 operates upon receipt of an oscillating signal v(t) from central office 400 at terminal 101. First transformer 110 splits the signals between secondary windings 114 and 116, respectively, to produce equal signal v'(t).

Signal v'(t) in the second circuit passes from secondary winding 116 to secondary winding 124. Simultaneously, signal v'(t) in the first circuit exits secondary winding 114 from node 2 into device 200 through terminal 102, whereupon device 200 emits signal v'(t) and an ECHO (i.e., the original signal plus an echo) to node 10 of secondary winding 126. Since secondary windings 124 and 126 are reversed, the signal v'(t) plus echo in secondary winding 126 (i.e., signal v''(t)) is out of phase with signal v'(t) in secondary winding 124, the incoming signals offset. Since the signals in secondary windings 124 and 126 differ only by the ECHO signal, the original signals v'(t) cancel out such that only the ECHO signal emits from primary winding 122.

The above can be represented mathematically as follows. The effect of each secondary winding 124 and 126 on primary winding 122 of transformer 122 is given by:

$$\text{winding } 126 - 124 = v''(t) - v'(t)$$
$$= v'(t) + \text{ECHO} - v'(t)$$
$$= \text{ECHO}$$

The resultant ECHO signal is output from terminal 103 to level meter 300. Level meter 300 shows the ECHO signal strength and calculates the Echo Return Loss (ERL) according to the equation $$ERL = \text{ECHO} + 9.0 \ dB$$

The constant 9.0 dB is an approximation of the loss in the signal strength induced by the internal components of ERL adaptor 100.

The above design of ERL adaptor 100 produces numerous advantages over the prior art. The elimination of wide bandwidth noise permits highly accurate echo measurement. The uncomplicated nature of the ERL adapter circuit permits inexpensive construction of a lightweight and portable unit. Since the circuit is entirely self-contained, it does not require any adjustment or user interaction (other than to plug it in). Thus, using this present invention, a technician can, while balancing a network, monitor the echo return loss to determine the network parameters which minimize echo in the communication system.

As noted above, device 200 is typically an MFT or MFT extender. Commercially available MFT's typically have a COMPNET impedance of 900 Ohms+2.0 mF; given the resistances within the wires and the circuit itself, the total impedance at the input of the MFT or MFT exterior is approximately 910 Ohms+2.0 mF. Thus, resistor 130 is preferably a 910 Ohm resistor, while first capacitor 140 is preferably a 2.0 mF capacitor.

In order to eliminate the effects of DC current in the first bridging circuit, second capacitor 150 is inserted between node 9 of secondary winding 126 and node 5 of secondary winding 114. Since the impedance of the first and second bridging circuits must remain equal to produce the pure ECHO signal, third capacitor 160, having an equal capacitance to that of second capacitor 150, is placed between node 3 of secondary winding 116 and node 8 of secondary winding 124. Given a circuit impedance of 910 Ohms+2.0 mF, the second and third capacitors are preferably 2.0 mF.

It is noted that the resistors and capacitors used in the ERL adaptor preferably have tolerances within 2% of expected values to achieve the desired impedance match. While circuit elements with larger tolerances could be used, the accuracy of the ERL device would diminish accordingly.

While the invention has been described with reference to several exemplary embodiments, it is understood that the words which have bene used herein are words of description and illustration, rather than words of limitations. Changes may be made, within the purview of the pending claims, as without effecting the scope and spirit of the invention and its aspects. While the invention has been described here with reference to particular means, materials and embodiments, the invention is not intended to be limited to the particular disclosed herein; rather, the invention extends to all functionally equivalent structures, methods and uses, such at all within the scope of the appended claims.

For example, while the values of resistor 130 and first capacitor 130 are preferably 910 Ohm and 2.0 mF to match the impedance of commercially available MFT's, these values could be adjusted to match those of any particular MFT. Typically MFT's which are compatible with the present invention include Western Electric MT 22222A, Transcom MTC2TY31, and Wilcom VFR 7616; there are however, numerous such commercially available MFT's, and the present invention is not limited to those listed above.

Further, any combination of components which match the impedance of the MFT may be utilized; for example, two or more resistors and/or capacitors could be used to create the desired matching impedance with the MFT. Thus, while it is preferable to utilize a single resistor and capacitor in series, the present invention is not limited to this configuration.

In a further example, the approximate loss of 9.0 dB is based upon the preferred embodiment of the invention, i.e., a single 910 Ohm resistor and a single 2.0 mF capacitor. To the extent that other combinations of circuit elements are used to match the impedance of external device 200, then the loss may be different.

In a still further example, although it is preferable that the ERL adaptor receive the oscillating signal from a central office, any source of an appropriate signal would be equally effective.

What is claimed:

1. An adaptor for measuring echo return loss, said adaptor being connectable with an external device having an impedance, said adaptor comprising:

a first transformer having a first primary winding connected to an input terminal, and first and second secondary windings;

a second transformer having a second primary winding connected to an output terminal, and third and fourth secondary windings;

a first circuit including said second secondary winding, said third secondary winding, and a plurality of circuit elements, said circuit elements having an impedance substantially equal to said impedance of said external device; and a second circuit including said first and fourth secondary windings and a communication terminal.

2. The adaptor of claim 1, wherein an impedance of said first circuit substantially matches an impedance of said second circuit when connected to said external device.

3. The adaptor according to claim 1, wherein when a signal is applied to said input terminal and said device is connected to said communications terminal, the echo return loss of said device is given by the equation:

$$ERL=ECHO-k$$

wherein

ERL is said echo return loss;

ECHO is a signal level output of said output terminal; and k is a signal strength loss of said adaptor.

4. The adaptor of claim 3, wherein k is approximately 9.0 dB.

5. The adaptor of claim 1, wherein said plurality of circuit elements includes at least a resistor and a first capacitor.

6. The adaptor of claim 1, wherein said plurality of circuit elements includes a resistor and first and second capacitors, and said second circuit includes a third capacitor.

7. The adaptor of claim 6, wherein said second capacitor has a capacitance equal to that of said third capacitor.

8. The adaptor of claim 1, wherein said external device is one of an MFT and MFT extender.

9. The adaptor of claim 1, wherein said first and second circuits are 180 degrees out of phase.

10. An adaptor for measuring an echo return loss, comprising:

first and second transformers, each having a primary winding and first and second secondary windings, said primary winding of said first transformer being connected to a first terminal to receive a signal, and said primary winding of said second transformer being connected to a second terminal to output a signal;

a first circuit including said first secondary winding of said first transformer, said second secondary winding of said second transformer, and a third terminal for connection to an external device;

a second circuit including said first secondary winding of said second transformer, said second secondary winding of said first transformer, at least one resistor and at least one capacitor; and said first and second circuits having a substantially equal impedance when said external device is connected to said third terminal.

11. The adaptor of claim 10, wherein an impedance of said at least one resistor and said at least one capacitor is substantially equal to an impedance of said external device.

12. The adaptor of claim 10, wherein when said device is connected to said third terminal and a signal is applied to said first terminal, said echo return loss of said device is given by the equation:

$$ERL=ECHO-k$$

wherein:

ERL is said echo return loss;

ECHO is the signal level of said output signal; and k is a signal loss of the system.

13. The adaptor of claim 12, wherein k is approximately 9.0 dB.

14. The adaptor of claim 10, wherein said first circuit and said second circuit are 180 degrees out of phase.

15. An adaptor for measuring echo return loss, said adaptor being connectable with an external MFT device, said adaptor comprising:

a first transformer having a first primary winding connected to an input terminal, and first and second secondary windings;

a second transformer having a second primary winding connected to an output terminal, and third and fourth secondary windings;

a first circuit including said second secondary winding, said third secondary winding, a resistor and first and second capacitors, said resistor and said first capacitor having an impedance substantially equal to a COMP-NET impedance of said external MFT;

a second circuit including said first and fourth secondary windings, a third capacitor and a communication terminal; and said second and third capacitors having equal capacitances.

16. The adaptor of claim 15, wherein an impedance of said first circuit substantially matches an impedance of said second circuit when connected to said external device.

17. The adaptor according to claim 16, wherein when a signal is applied to said input terminal and said device is connected to said communications terminal, the echo return loss of said service is given by the equation:

$$ERL = ECHO - k$$

wherein:

ERL is said echo return loss;

ECHO is a signal level output of said output terminal; and k is a signal loss of said adaptor.

18. The adaptor of claim 17, wherein k is approximately 9.0 dB.

19. The adaptor of claim 18, wherein the resistance of said first resistor is a 910 Ohms, and the capacitance of said first, second, and third capacitors are 2.0 mF.

* * * * *

UNITED STATES PATENT AND TRADEMARK OFFICE
CERTIFICATE OF CORRECTION

PATENT NO. : 5,943,392
DATED : August 24, 1999
INVENTOR(S) : G. OLSON

It is certified that error appears in the above-identified patent and that said Letters Patent is hereby corrected as shown below:

At column 9, line 2 (claim 17, line 4) of the printed patent, "service" should be ---device---.

Signed and Sealed this

Twenty-fourth Day of October, 2000

*Attest:*

Q. TODD DICKINSON

*Attesting Officer*      *Director of Patents and Trademarks*